United States Patent
Busch et al.

(10) Patent No.: US 9,729,449 B2
(45) Date of Patent: Aug. 8, 2017

(54) METHOD AND APPARATUS FOR ENHANCED ROUTING WITHIN A SHORTEST PATH BASED ROUTED NETWORK CONTAINING LOCAL AND LONG DISTANCE LINKS

(71) Applicant: Brocade Communications Systems, Inc., San Jose, CA (US)

(72) Inventors: Scott Busch, Louisville, CO (US); Ethan Cardwell, Middletown, MD (US); Peter Cieslar, Arvada, CO (US); Howard Johnson, Louisville, CO (US); Jesse Willeke, Broomfield, CO (US)

(73) Assignee: Brocade Communications Systems, Inc., San Jose, CA (US)

( * ) Notice: Subject to any disclaimer, the term of this patent is extended or adjusted under 35 U.S.C. 154(b) by 442 days.

(21) Appl. No.: 13/793,441

(22) Filed: Mar. 11, 2013

(65) Prior Publication Data
US 2014/0010077 A1 Jan. 9, 2014

Related U.S. Application Data

(60) Provisional application No. 61/664,552, filed on Jun. 26, 2012.

(51) Int. Cl.
*H04L 12/801* (2013.01)
*H04L 12/721* (2013.01)
*H04L 12/803* (2013.01)
*H04L 12/741* (2013.01)

(52) U.S. Cl.
CPC .............. *H04L 47/12* (2013.01); *H04L 45/12* (2013.01); *H04L 45/54* (2013.01); *H04L 47/125* (2013.01)

(58) Field of Classification Search
CPC ..................................................... H04L 47/12
USPC ............... 370/229, 235, 238, 254; 709/241; 398/45
See application file for complete search history.

(56) References Cited

U.S. PATENT DOCUMENTS

| 7,334,046 B1* | 2/2008 | Betker ........................ 709/241 |
| 7,814,227 B2* | 10/2010 | Vasseur et al. ............... 709/241 |
| 8,014,371 B1* | 9/2011 | Miller .................. H04W 24/06 370/255 |
| 2002/0141343 A1* | 10/2002 | Bays ............................. 370/235 |
| 2004/0246911 A1* | 12/2004 | Bonsma et al. .............. 370/254 |

(Continued)

*Primary Examiner* — Brian D Nguyen
*Assistant Examiner* — Toan Nguyen
(74) *Attorney, Agent, or Firm* — Blank Rome, LLP (57) ABSTRACT

Use of a Location ID in addition to normal information to allow development of non-shortest path routes. The edge switches which terminate the distance links between locations are identified. Shortest path routes are determined for all switches in the same location. For each edge switch, routes over the distance links to other locations are determined, marking the interface connected to the distance links. The two determined sets of routes are combined. For devices directly connected to the edge switch, only the marked interface is used to reach the other location. For switches directly connected to the edge switch, use only routes from non-marked interfaces to marked interfaces and remove any routes from marked to marked or non-marked to non-marked interfaces. This operation for the directly connected switches allows single hops that are non-shortest path to an edge switch and removes certain potential loopback situations due to shortest path routes.

4 Claims, 7 Drawing Sheets

(56) References Cited

U.S. PATENT DOCUMENTS

| | | | |
|---|---|---|---|
| 2005/0083936 A1* | 4/2005 | Ma | H04L 45/04 370/392 |
| 2009/0162058 A1* | 6/2009 | DeSanti et al. | 398/45 |
| 2010/0220736 A1* | 9/2010 | Mohapatra | H04L 45/04 370/401 |
| 2011/0199938 A1* | 8/2011 | Kompella | 370/254 |
| 2011/0242995 A1* | 10/2011 | Zhang | H04L 45/00 370/252 |

* cited by examiner

METHOD AND APPARATUS FOR ENHANCED ROUTING WITHIN A SHORTEST PATH BASED ROUTED NETWORK CONTAINING LOCAL AND LONG DISTANCE LINKS

CROSS REFERENCE TO RELATED APPLICATIONS

This application claims the benefit under 35 U.S.C. §119 (e) of U.S. Provisional Patent Application Ser. No. 61/664,552 entitled "Localization of FSPF," filed Jun. 26, 2012, which is hereby incorporated by reference.

BACKGROUND OF THE INVENTION

1. Field of the Invention

The invention relates to network routing and more particularly routing between separated fabrics.

2. Description of the Related Art

The increasing demands for network and fabric redundancy and resiliency have driven many users to adopt geographically separated locations for replication of data and processing. These locations may be as close as neighboring buildings or as far as separate countries. Frequently, these networks stretch across many states or even a country. Despite the great distances, the locations continue to act as a single network.

To provide connectivity between the locations, much of the technology and infrastructure needed can be very costly and relatively low throughput. As demands for data and processing grow larger, these inter-location links continue to be a source of the most significant bottlenecks when routing traffic between locations. The discrepancies between the relatively low throughput inter-location links and the high throughput intra-location links adds to the congestion and traffic back-pressure experienced throughout the fabric.

For many of the reliable networking or lowest cost path protocols deployed within a datacenter network, routing decisions analyze the entire network to choose the best possible path all the way through the network. The need to expose data about all parts of the network has benefits and shortcomings. When the entire network exists as one, traffic can be routed along the best possible path instead of relying on predefined exit points or hierarchical structuring of the network for passing traffic from one point in the network to another. But, it also means that all network elements must know about all available paths within the network and this starts impacting the size to which the network can grow.

Within these reliable networks, a common approach for ranking the available paths through the network is to assign a cost with each hop and then search for the lowest cost path from the ingress to egress points of the network. Within the Fibre Channel (FC) and Ethernet Fabric environments, the Fabric Shortest Path First (FSPF) module is responsible for analyzing the set of links exposed by the switches in the fabric and finding the lowest cost path through the fabric to reach each destination.

In Fibre Channel, routing of packets is done based on a Fabric Shortest Path First (FSPF) protocol. FSPF is described in the FC-SW-5 standards document. Quoting from FC-SW-5, Section 8.1.1:

FSPF is a link state path selection protocol. FSPF keeps track of the state of the links on all Switches in the Fabric and associates a cost with each link. The protocol computes paths from a Switch to all the other Switches in the Fabric by adding the cost of all the links traversed by the path, and choosing the path that minimizes the cost. The collection of link states (including cost) of all the Switches in a Fabric constitutes the Link State Database.

FSPF has four major components:

a) A Hello protocol, used to establish connectivity with a neighbor Switch, to establish the identity of the neighbor Switch, and to exchange FSPF parameters and capabilities;

b) A replicated Link State Database, with the protocols and mechanisms to keep the databases synchronized across the Fabric;

c) A path computation algorithm;

d) A routing table update.

The Link State Database synchronization in turn consists of two major components: an initial database synchronization, and an update mechanism. The initial database synchronization is used when a Switch is initialized, or when an Inter-Switch Link (ISL) comes up. The update mechanism is used in two circumstances:

a) When there is a link state change, for example an ISL going down or coming up;

b) On a periodic basis, to prevent switches from deleting topology information from the database.

The path computation algorithm shall be any algorithm that yields a minimum cost path, as defined above.

NOTE 27—One possible candidate is Dijkstra's algorithm, but this is not a requirement for interoperability.

The routing table update is not covered in this specification, since it is strictly implementation dependent. Different Switches may have different internal routing mechanisms, and still interoperate.

This works well when all of the switches are in a single, local fabric. Complications arise when long distance links are present because the fabrics are separated. It would be desirable to be able to better route when long distance links are present in the possible paths.

SUMMARY OF THE INVENTION

Embodiments according to the present invention utilize a Location ID in addition to normal information to allow development of non-shortest path routes. The edge switches which terminate the distance links between locations are identified. Shortest path routes are determined and used for all switches in the same location. For each switch, routes over the distance links to other locations are determined, noting or marking the interface connected to the distance links for edge switches and coupled to an edge switch with a distance link for non-edge switches. The two determined sets of routes are combined with a few limitations. For devices directly connected to the switch, use all eligible interfaces to reach the other location. For all Inter-Switch Links (ISLs), use only routes between a marked and non-marked interface and vice versa. Remove all ISL routes between two marked or two non-marked interfaces. This operation for the directly connected switches results in the possibility of single hops that are non-shortest path to an edge switch and removes certain potential loopback situations due to shortest path routes. With this operation better use is made of parallel distance links that when occur is only shortest path routing was used.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Figure 1:
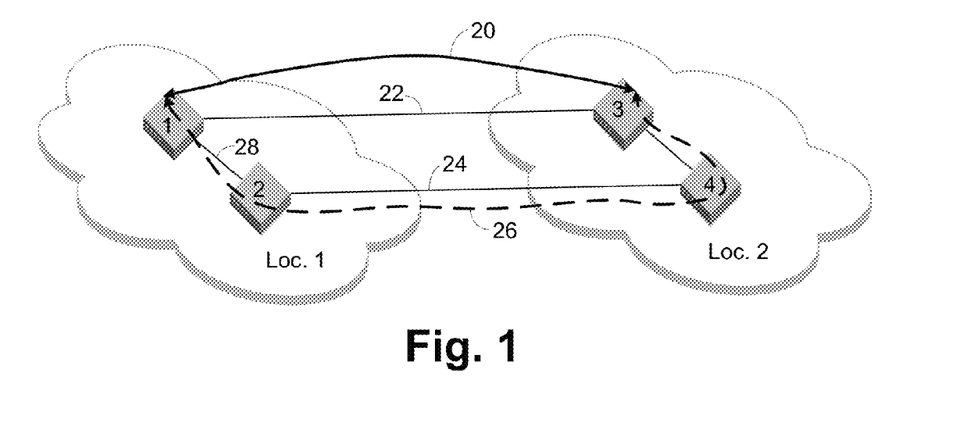
FIG. 1 is a block diagram of an exemplary network having two fabrics separated by inter-location links according to the present invention and illustrating shortest path and non-shortest path routes.

FIG. 1 shows a simple example network that demonstrates the principles of non-shortest path routing. Assume there are one or more devices attached to switch 1 in location 1 and they are communicating with one or more devices attached to switch 3 in location 2. Following shortest path routing rules, the path 20 between these devices uses the directly connected link 22 as represented by the solid black line. If the required throughput of these devices is greater than the available bandwidth of the link 22, then the link 22 is the bottleneck point. The devices can only pass as much traffic as the link 22 can handle. If the inter-location hops are long distance links, they are likely to be the greatest source of delay for a frame traversing between the locations. Due to the shortest path routing rules, these devices would be unable to use bottom link 24 between switches 2 and 4.

Since long distance hops typically have a high latency in comparison to the short hops within a location, it is practical to use non-shortest path routes. The non-shortest path 26 is marked by the dashed black arrowed line that starts at switch 1, hops to switch 2, then over to switch 4, and finally ends on switch 3. The latency of the two extra hops introduced along the dashed path is likely to be negligible compared to the single inter-location hop. Because of this, the in-flight time for frames flowing between these devices will only increase slightly.

Despite the longer travel times from source to destination by the extra hops, the added capacity of the devices to get more data through from location 1 to location 2 starts to outweigh those longer trip times. The devices are now able to get more data through and process more requests instead of being blocked waiting for buffers to become available. By utilizing the non-shortest path routes, total network throughput is increased.

The benefits of using non-shortest path routes are based on the evidence that there are distinct points in the fabric that are the most significant source of delay time through the fabric. Every hop a frame takes requires that frame to be buffered and held until it is the next frame to be transmitted. Every hop adds to the total in-flight travel time for a frame. This is why in a typical fabric the shortest paths are the most preferred since their traffic only uses paths with the lowest cost and/or fewest hops.

However, since all hops are not equal and some result in longer delays than others, accounting for these previously ignored details can be beneficial. The long distance hops have been identified as a source of a large portion of that total in-flight travel time. Therefore, the networks most likely to benefit from use of non-shortest path routes are those with high latency links connecting two locations in parallel. But, without the advantages of the low latency and high bandwidth links providing intra-location connectivity, the benefits may start diminish as well.

While multi-location networks are considered the primary example applications for non-shortest path routing, there are no restrictions to be used exclusively within these types of networks. They are simply the most likely candidates identified at this time to experience performance gains. As the concepts of non-shortest path routing in a network environment become more common, other networks may be identified as benefiting.

The total network throughput gains are dependent on more than just the available links in practice. One such factor that weighs heavily on the potential throughput gains is the traffic patterns of all devices in the network. If all of the inter-location links are already utilized at full capacity when using only the shortest path routes, there is little to gain by allowing the non-shortest path routes as well.

However, traffic patterns are likely to vary with time, which may be reflected with measured gains from non-shortest path routing. As jobs or tasks run on periodic cycles, there may be times when links are more heavily or lightly loaded. This variability in traffic patterns is expected but still needs to be considered when evaluating the potential gains by using the non-shortest path routes.

The preferred embodiment of non-shortest path routing within a fabric based network uses a Location ID for identifying which location each switch is a member of. This allows greater abstraction of the non-shortest path routes from implicit assumptions about any particular piece of technology and instead allows for greater levels of user control. This generalization removes ties to any explicit technologies and frees up the system to focus on the routing enhancements instead of trying to automatically identify the inter-location links based on implicit assumptions. The use of a Location ID defined per switch means the user only needs to configure a single property about the switch itself.

For the location ID, the preferred embodiment uses a numeric value but it could have been something else, such as an alpha-numeric string. The chosen location IDs just need to be common for all switches the user wants exposed as members of a single location. From here forward, the term location ID is used to represent the generic idea of a configured value for each switch and does not tie to any specific requirements on what the value is.

In order for the fabric to properly determine which location a switch is a member of, the user configured location ID needs to be distributed around to the rest of the network. The exact specifics of how the location IDs are distributed not particularly important. Implementations may use the existing FSPF Link State Record (LSR) Flooding protocols, including summary records within the LSRs, or use an alternative method for distributing the location ID information. Regardless of the distribution method, all switches need to be able to build the same membership groups with respect to which group the switches are located in.

Once the Location IDs for all switches have been shared with the entire network, it is possible to identify which switches are in which locations, the boundary switches, and any available inter-location links. A boundary switch may not have links to all remote locations. In this case, the switch is only considered a boundary switch for the remote locations reachable through it but not for any other location. With the boundary switches to a specific remote location identified, it is possible to then identify the inter-location link(s) that are available. When multiple parallel inter-location links are available from by two or more boundary switches, then they are candidates for non-shortest path routing.

With the boundary switches and their candidate links identified, the route determination processes can include the new paths when defining the routes that need to be programmed to the hardware. The domains that are reachable in a remote location behind the specified boundary switch are included when defining the routes to that boundary switch. This leads to an effective result of the boundary switches "shadowing" the domains that are behind it but in a remote location. Within the location or site, the traditional shortest path rules are followed for getting traffic to those boundary switches. In this discussion it is understood that in most conventional instances of Fibre Channel usage, a switch is treated as a domain, so that switch 1 would also be domain 1 and so on.

Once the boundary switches and the links available to get to them have been identified, a sub-set of these links need to be identified as unique from the others. This distinction is needed for later steps when the routes are established to ensure that routing loops are not present in the network. If one of the identified boundary switches is reachable by a lower cost path than the others, then the links to this boundary switch need the distinction. Within the location context, we call these the "shortest location links" because they are the shortest path to reach a remote location. If all boundary switches are an equal path cost from the current switch, then the distinction is not needed.

To make sure that frames do not end up in a loop and get stuck in the fabric, some of the traditional shortest cost path routes may need to be removed. Under the traditional routing rules, any traffic sent between the corners switches in the four switch example could use both paths as shown for traffic between switches 2 and 3 in FIG. 2. This is true for both device and link ports.

Figure 2:
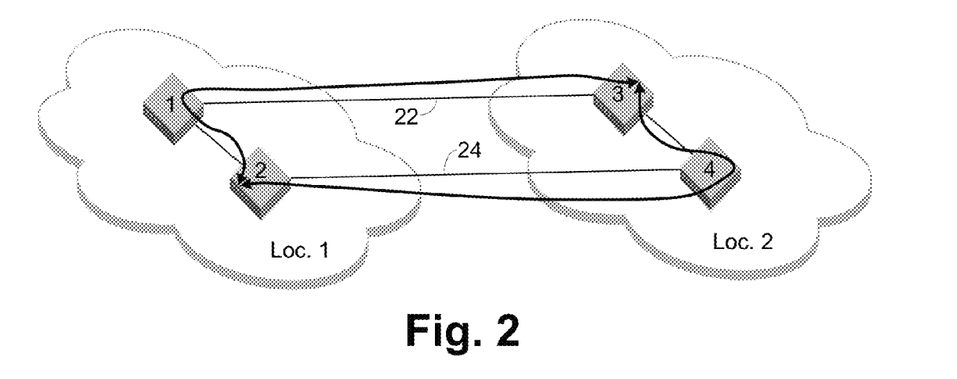
FIG. 2 is a version of the block diagram of FIG. 1 illustrating traditional routing rules.

However, for links between switches, some routes are not programmed due to them being "loopback" routes. Under the shortest path routing rules, the shortest cost path from switch 1 to 3 would use the directly connected link. Switch 1 should never send traffic for switch 3 through switch 2 as this would not be following the routing rules. Because of the these expectations, switch 2 would not program any routes on the ingress side of the link between itself and switch 1 for routing traffic to switch 3. Switch 2 is already expecting to use that vertical link between itself and switch 1 for routing traffic to switch 3. So, any frames arriving on that link destined for switch 3 would potentially be sent back out the same link it came in on and hence the appearance of "loopback" routes. If these rules were not followed, the frame could continue bouncing between switches 1 and 2 and never make it to switch 3.

However, with the new non-shortest path routing strategy, frames can arrive on switch 2's side of the link 28 between switches 1 and 2 that are addressed to switch 3. For this reason, certain routes are changed in a manner that allow the non-shortest path routes but avoid routing loops. Some scenarios require the removal of routes that would have existed previously while other scenarios require additional considerations for which routes are defined as valid.

Figure 3:
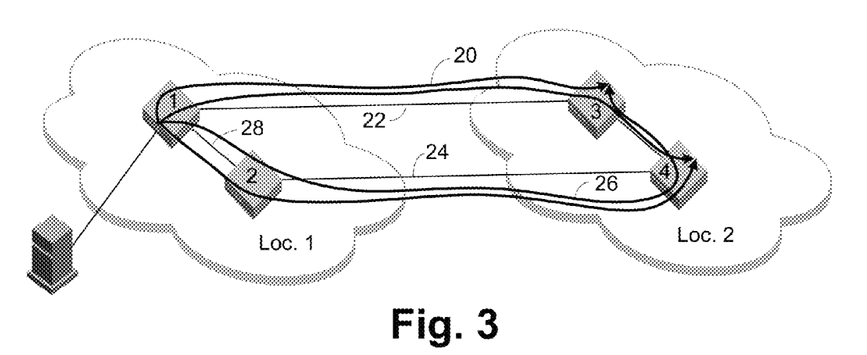
FIG. 3 is a version of the block diagram of FIG. 1 illustrating a combination of traditional routing rules and non-shortest path routing according to the present invention.

The simplest case of these is the routes for devices. The enhanced routes for non-shortest path routing is programmed at the ingress point for the frames entering the fabric. To avoid conflicts later along the path of knowing which ingress routes can or cannot use the non-shortest path routes, restrictions were made to the point of origin for the frame entering the fabric. The F_Ports of the FC switch use the additional non-shortest path routes where they are valid. The switch, therefore, starts with the standard shortest path routes and includes the new routes as well. The result is the combined routes of FIG. 1 and FIG. 2 as demonstrated in FIG. 3.

Figure 4:
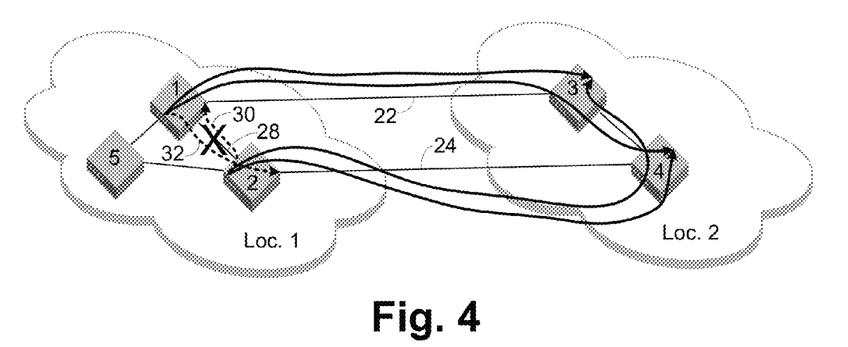
FIG. 4 is a block diagram of an exemplary network having two fabrics separated by distance links according to the present invention and illustrating the exclusion of local inter-switch links from routing.

The E_Port routes, however, require a bit more work to ensure the proper routes are setup. First, to ensure there are no extra hops within the location, E_Port to E_Port routes for a domain in a remote location are constrained to using only the routes that are marked as the "shortest location links" from above. Where the ingress port for the link on switch 2 from switch 5 (FIG. 4) would look more like the routes shown in FIG. 2 with traditional shortest path routing, with the new non-shortest path constraints routes 30, 32, are shown as the dashed lines, are removed. The result is fewer routes for these E_Ports. If the link between switches 2 and 5 was not constrained to only using the marked "shortest location links," then both switches 1 and 2 would be splitting some of the traffic they receive from switch 5 and sending it across the vertical link 28. This would result in more, and unnecessary, congestion on the intra-location links since they would still be restricted by the inter-location links 22, 24.

The second set of E_Port route changes account for routes that used to be ignored due to being "loopback" routes but are now needed to allow the non-shortest path routing. From switch 2's perspective, under traditional shortest path routing, it expects to send traffic through switches 1 and 4 to reach switch 3. Any routes that established a data path between these links through switch 2 would qualify as the "loopback" routes since a frame could arrive on a port that the switch is expecting to send the traffic back out on. But, within a non-shortest path scenario, some of these routes need to be setup so traffic can route across the network to a remote location.

Figure 5:
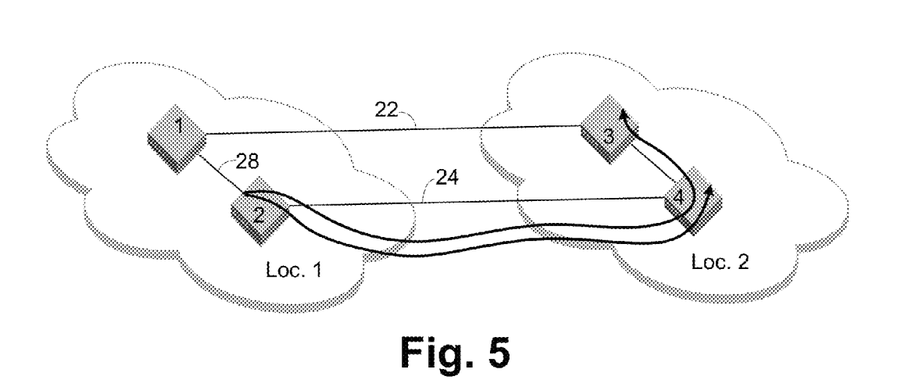
FIG. 5 is a version of the block diagram of FIG. 1 illustrating route changes for non-shortest path routing according to the present invention.

Looking at the ingress port on switch 2 for the link between itself and switch 1, the routes to both switches 3 and 4 are programmed. This mean that for an intra-location E_Port, the programming of its routes are between that E_Port and the "shortest location links" only. In this manner, the routes as shown in FIG. 5 are developed. Without these new routes, traffic would be dropped at the ingress port on switch 2 since there previously would have been no routes through switch 2.

However, the route validation logic must continue to make sure that a route is not established between one or more links connecting to the same neighboring switch. For example, on switch 2 a route should not be programmed on the port of the link 28 between switches 1 and 2 that can be used to route traffic back to switch 1.

The logic needs to examine the routes between two E_Ports and properly account for which loopback routes are needed and which are still forbidden. Since some of the traditional routes are excluded whereas others are retained, it is important to make sure all switches are doing the same behavior. If one switch is not following the new routing strategy, another switch may be expecting to send non-shortest path traffic through it, which may all be discarded.

In the end, the E_Port to E_Port routing strategy for non-shortest paths allows a single hop parallel to the location boundary before it resumes following the standard shortest path rules to reach the final destination. Traffic is not allowed to be routed to a switch that has more hops between it and the boundary than the current switch has. For example, if we consider switch 1 talking to switch 3 but taking the non-shortest path through switches 2 and 4, at the ingress point for a frame originating on switch 1, it is allowed to take the 1 non-shortest path hop over to switch 2. From that point to on, the frame follows the shortest path rules to reach the final destination: switch 3. Since switches 1 and two are both boundary switches, this non-shortest path hop is parallel to the location boundary.

By allowing use on non-shortest path routes through the fabric, there is increased network utilization within these multi-location networks connected via long distance links. Further, this has been accomplished without requiring physical modifications to the network. The only necessary changes are on a software level through modifications to the routes programmed to the hardware.

Figure 6A:
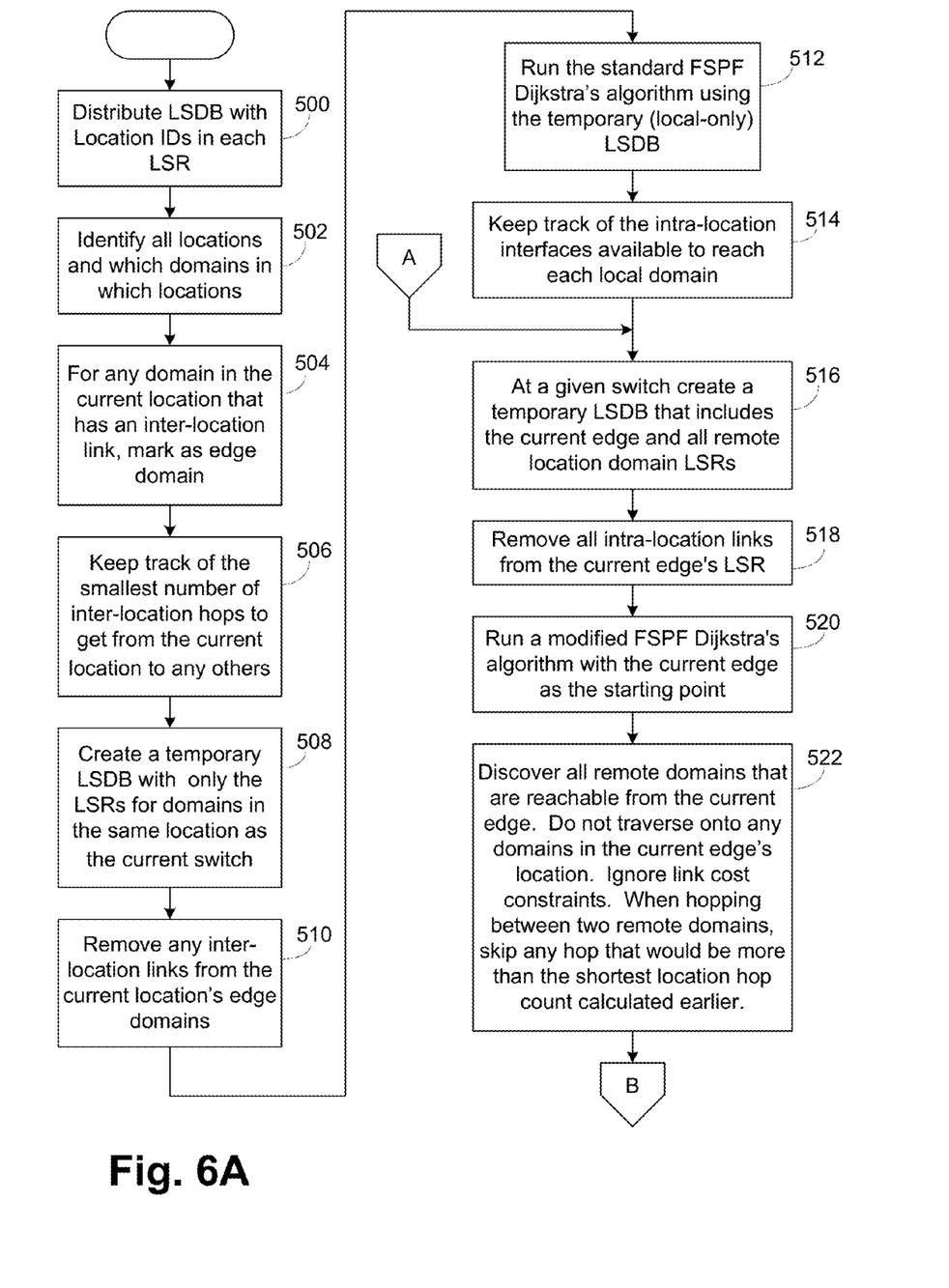
FIGS. 6A and 6B are a flowchart of route determination operations according to the present invention.
Figure 6B:
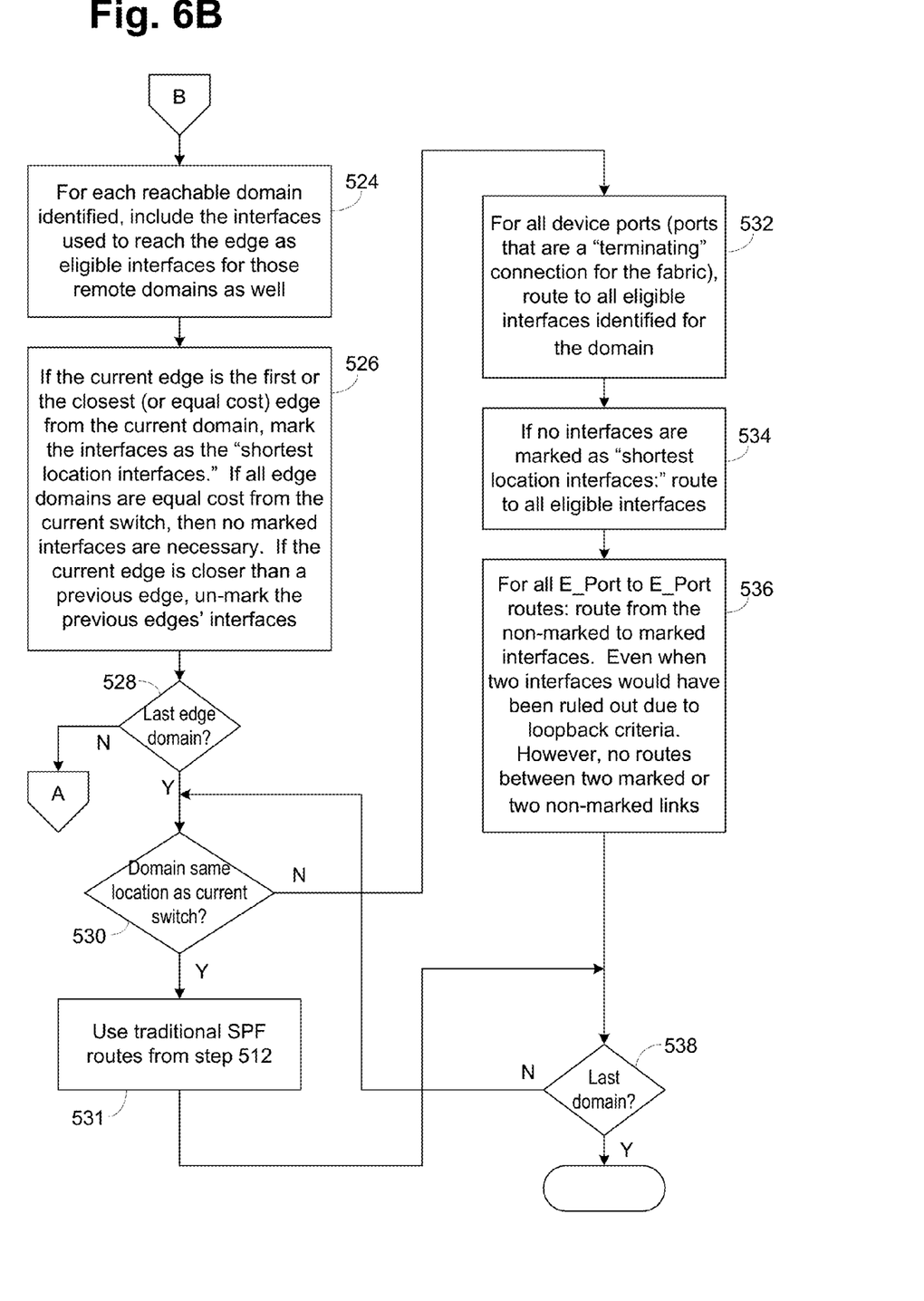

FIGS. 6A and 6B are a flowchart of the operations generally described above. In step 500, distribute the LSDB per the standard, with each LSR including the Location ID to the switch. In step 502, identify all locations and which domains are in which location. This can be done using a modified version of the FSPF Dijkstra's algorithm that calculates using only location information and not individual switches within a location. In step 504, for any domain in the current location that has an inter-location link, mark it as an edge domain. In step 506, keep track of the smallest number of inter-location hops to get from the current location to any others. In step 508, create a temporary LSDB with only the LSRs for domains in the same location as the current switch. In step 510, remove any inter-location links from the current location's edge domains. In step 512 run the standard FSPF Dijkstra's algorithm using the temporary, local-only LSDB. In step 514, keep track of the intra-location interfaces available to reach each local domain.

In step 516, for a given edge switch or domain, create a temporary LSDB that includes the current edge and all remote location domain LSRs. In step 518, remove all intra-location links from the current edge's LSR. In step 520, run FSPF Dijkstra's algorithm with the current edge as the starting point. In step 522, discover all remote domains that are reachable from the current edge. Do not traverse onto any domains in the same location as the current edge. Ignore link cost constraints as it is only necessary to know which domains are reachable. When hopping between two remote domains, skip any hop that would be more than the shortest location hop count calculated earlier. In step 524, for each reachable domain identified, include the interfaces used to reach the edge as eligible interfaces for those remote domains as well. In step 526, if the current edge is the first or the closest or equal cost edge from the current domain, mark the interfaces as the "shortest location interfaces." If all edge domains are equal cost from the current switch, then no marked interfaces are necessary. If the current edge is closer than a previous edge, un-mark the previous edges' interfaces. In step 528, this is not the last edge domain, return to step 516.

Next, calculate the interfaces to use to reach each domain by iterating over all domains in the fabric; both local and remote locations. If this is not the last domain, at step 530, then for a given switch, determine if the domain is in the same location as the current switch. If so, in step 531 for any domain in the same location as the current switch use the traditional SPF routes from step 512, otherwise do the following for all remote domains. If not the same location in step 530, in step 532, for all device ports that are a "terminating" connection for the fabric, route to all eligible interfaces identified for the domain. In step 534, if no interfaces are marked as "shortest location interfaces," route to all eligible interfaces. In step 536, for all E_Port to E_Port routes route from the non-marked to marked interfaces, even when two interfaces would have been ruled out due to loopback criteria. However, no routes are allowed between two marked or two non-marked links. In step 538, after steps 531 or 536, if this is not the last domain, the steps are repeated from step 530. If this is the last domain, route determination is completed and the routing table can be distributed to the routing hardware.

Figure 7:
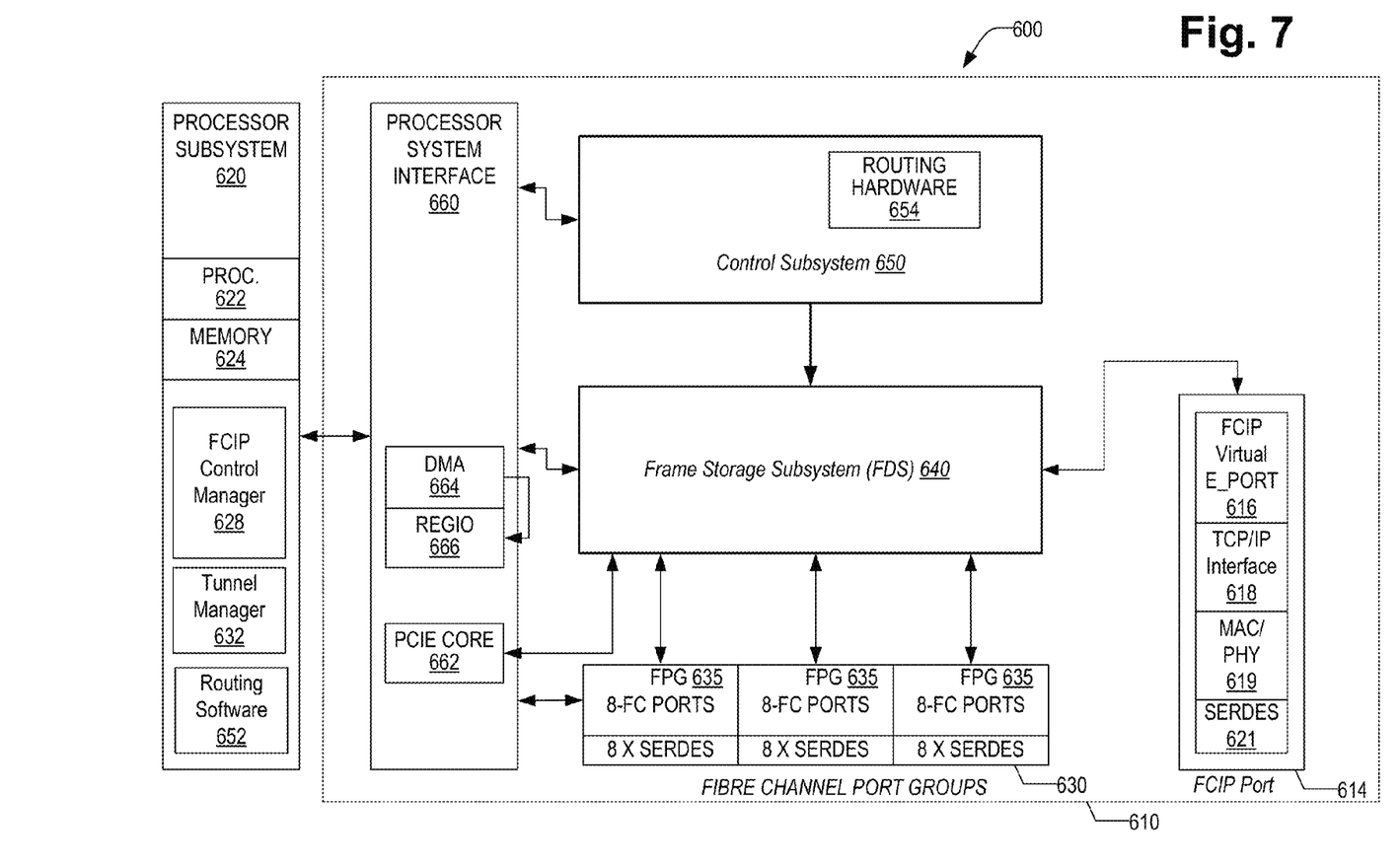
FIG. 7 is a block diagram of an exemplary switch and distance gateway.

FIG. 7 is an exemplary switch and distance gateway that can be used as an edge switch according to the present invention. A Fibre Channel switch ASIC 610 is combined with a processor subsystem 620 to provide a complete Fibre Channel network switch and gateway 600. Multiple ASICs 610 can be arranged in various topologies to provide higher port count, modular switch chassis. The ASIC 610 and processor subsystem 620 are illustrative and by way of example only, and other hardware implementations can be used as desired.

The ASIC 610 comprises four major subsystems at the top-level as shown in FIG. 7: a Fibre Channel Protocol Group Subsystem 630, a Frame Data Storage Subsystem 640, a Control Subsystem 650, and a Processor System Interface 660. Some features of the ASIC 610 that are not relevant to the current discussion have been omitted for clarity of the drawing.

The Fibre Channel Protocol Group (FPG) Subsystem 630 comprises 3 FPG blocks 635, each of which contains 8 port and SERDES logic blocks to a total of 24 E, F, and FL ports.

The Frame Data Storage (FDS) Subsystem 640 contains the centralized frame buffer memory and associated data path and control logic for the ASIC 610.

The Control Subsystem 650 provides frame routing, header editing and filtering or zoning functions. Routing hardware 654 contains the routing table used to perform the routing of the frames. This is the routing table that is developed as described above and shown in examples below.

The Processor System Interface 660 provides the processor subsystem 620 with a programming interface to the ASIC 610. It includes a Peripheral Component Interconnect Express (PCIe) Core 662, a DMA engine 664 to deliver frames and statistics to and from the processor, and a top-level register interface block 666. As illustrated in FIG. 7, the ASIC 610 is connected to the Processor Subsystem 620 via a PCIe link controlled by the PCIe Core 662, but other architectures for connecting the ASIC 610 to the Processor Subsystem 620 can be used.

An FCIP (FC over IP) port 614 is provided in the ASIC 610 to provide the gateway function used with long distance connections. An FCIP virtual E_Port 616 is connected to the FDS 640 to allow frames to be routed between the normal FC ports and the Ethernet hardware of the FCIP port 614. A TCP/IP interface is connected to the virtual E_Port 616, A MAC/PHY 619 is connected to the TCP/IP interface 618 as the next portion of the Ethernet interface. Finally a SERDES 621 is connected to the MAC/PHY 619 and is the external port that is connected to the WAN to function as the long distance link. Portions of the FCIP port 614 may include embedded processors to handle certain aspects of the FCIP protocol, such as the TCP/IP portions. In certain embodiments the FCIP port 614 may be external to the ASCI 610 and implemented in FPGAs or the like, in which case it is connected internally to the switch 600 to a port in one of the FPGs 635.

Some functionality described above can be implemented as software modules in an operating system or application running on a processor 622 of the processor subsystem 620 and stored in a memory 624 or other storage medium of the processor subsystem 620. This software may be provided during manufacture of the switch 600, or provided on any desired computer-readable medium, such as an optical disc, and loaded into the switch chassis 600 at any desired time thereafter. This typically includes functionality such as the software that allows the creation of the routing tables as discussed herein. Specific software preferably includes an FCIP control manager 628 and a tunnel manager 632 to operate the FCIP port 614. Routing software 652 is provided to perform the operations discussed herein and to provide the final routing table to the routing hardware 654.

Figure 8:
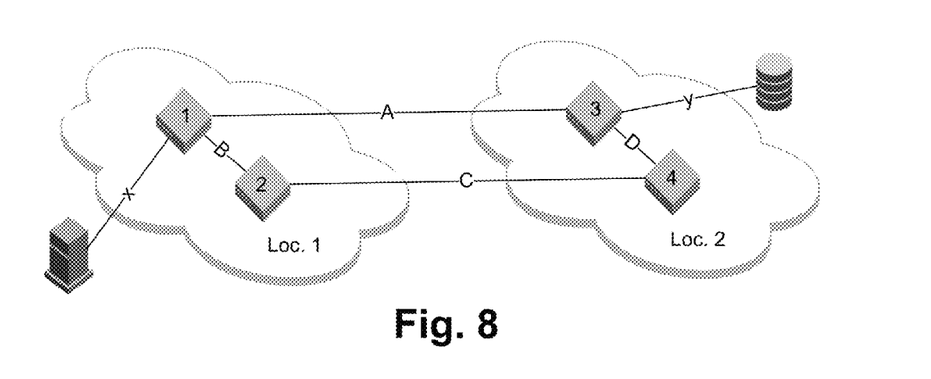
FIGS. 8, 9 and 10 are exemplary networks having two fabrics.
Figure 9:
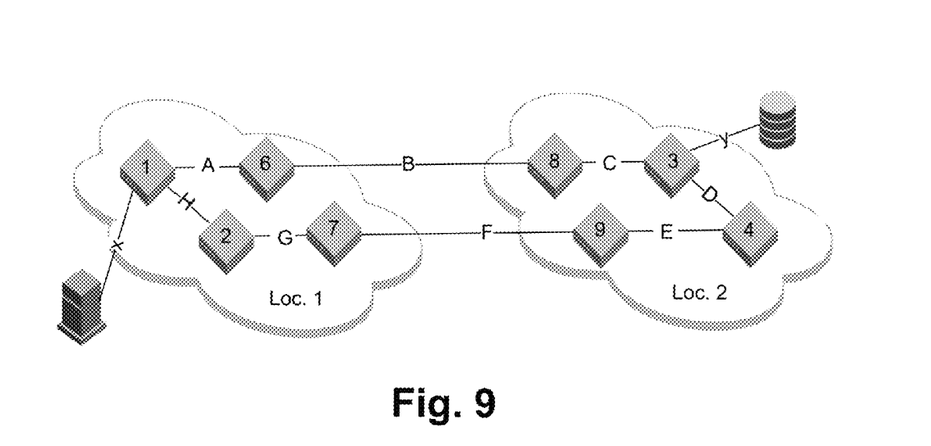
Figure 10:
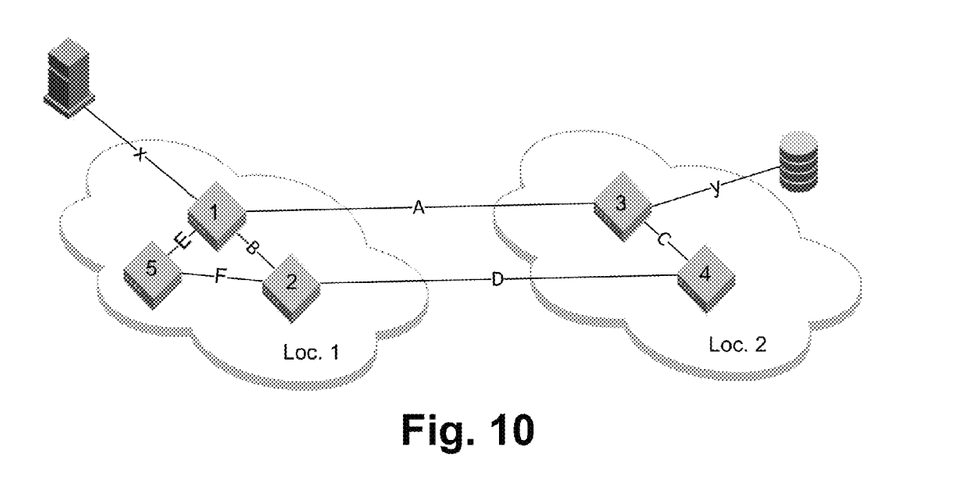

FIGS. 8, 9 and 10 are exemplary networks used to illustrate the above operations with selected examples.

Operation of the flowchart of FIGS. 6A and 6B for the network of FIG. 8 from switch 1's perspective is as follows:

1) LSDB is flooded to all switches in the network; each LSR includes a Location ID: 1 for switch 1
2) Run "location SPF" to determine membership and location hop count:
  Domain 1: location 1, 0 hops
  Domain 2: location 1, 0 hops
  Domain 3: location 2, 1 hops
  Domain 4: location 2, 2 hops
  Edge domains: 1, 2
3) Create temporary LSDB with local members and no inter-location links:
  Domain 1: B
  Domain 2: B
4) Run standard FSPF with temporary LSDB:
  Domain 1: <root>
  Domain 2: 1 hop, hop cost 500, interfaces: B
5) Once for each edge domain, determine remotely reachable domains:
  5a-b:1) Edge=Domain 1: create temporary LSDB:
    Domain 1: A
    Domain 3: A, D
    Domain 4: C, D
  5c-d:1) Run modified SPF calculations for reachable domains:
    Reachable domains: 3, 4
  5e:1) Include reachable interfaces (existing+edge's):
    Domain 3: A
    Domain 4: A
  5f:1) First or closest edge?→First→mark special interfaces
    Domain 3: A*
    Domain 4: A*
  5a-b:2) Edge=Domain 2: create temporary LSDB:
    Domain 2: C
    Domain 3: A, D
    Domain 4: C, D
  5c-d:2) Run modified SPF calculations for reachable domains:
    Reachable domains: 3, 4
  5e:2) Include reachable interfaces (existing+edge's):
    Domain 3: A*, B
    Domain 4: A*, B
  5f:2) First or closest?→Neither: nothing to do.
    Domain 3: A*, B
    Domain 4: A*, B
  Summary of expected egress interfaces:
    Domain 1: <root>
    Domain 2: B
    Domain 3: A*, B
    Domain 4: A, B
6) Setup routes as shown in Table 1:

Underlined routes are the new for non-SPF routing. Routes with an asterisk are inter-location routes.

TABLE 1

| Ingress Port | Destination Domain | Egress interfaces |
|---|---|---|
| x | 2 | B |
|   | 3 | A*, <u>B</u> |
|   | 4 | A*, B |
| A | 2 | B |
|   | 3 | <None> |
|   | 4 | <None> |
| B | 2 | <None> |
|   | 3 | A* |
|   | 4 | <u>A*</u> |

Of note is that step 536 is applicable when establishing routes for ingress port B to switches/domains 3 and 4. A non-marked interface (B) is routing to a marked interface (A). The normal loopback criteria, for switch/domain 4 is overridden and the route allowed instead of removed.

Operation of the flowchart of FIGS. 6A and 6B for the network of FIG. 9 from the perspective of switch 1 is as follows:

1) LSDB is flooded to all switch in the fabric; each LSR includes a Location ID: 1 for switch 1
2) Run "location SPF" to determine membership and location hop count:
  Location 1: Domains: 1, 2, 6, 7; Hops: 0
  Location 2: Domains: 3, 4, 8, 9; Hops: 1
  Edge domains: 6, 7
3) Create temporary LSDB with local members and no inter-location links:
  Domain 1: A, H
  Domain 2: G, H
  Domain 6: A
  Domain 7: G
4) Run standard FSPF with temporary LSDB:
  Domain 1: <root>
  Domain 2: 1 hop; hop cost 500; interface: H
  Domain 6: 1 hop; hop cost 500; interface: A
  Domain 7: 2 hops; hop cost 1000; interface: H
5) Once for each edge domain, determine remotely reachable domains:
  5a-b:6) Edge=Domain 6: create temporary LSDB:
    Domain 3: C, D
    Domain 4: D, E
    Domain 6: B
    Domain 8: B, C
    Domain 9: E, F
  5c-d:6) Run modified SPF calculations for reachable domains:
    Reachable domains: 3, 4, 8, 9
  5e:6) Include reachable interfaces (existing+edge's):
    Domain 3: A
    Domain 4: A
    Domain 8: A
    Domain 9: A 5f:6) First or closest edge?→First→mark special interfaces
  Domain 3: A*
  Domain 4: A*
  Domain 8: A*
  Domain 9: A*
5a-b:7) Edge=Domain 7: create temporary LSDB:
  Domain 3: C, D
  Domain 4: D, E
  Domain 7: F
  Domain 8: B, C
  Domain 9: E, F
5c-d:7) Run modified SPF calculations for reachable domains:
  Reachable domains: 3, 4, 8, 9
5e:7) Include reachable interfaces (existing+edge's):
  Domain 3: A*, H
  Domain 4: A*, H
  Domain 8: A*, H
  Domain 9: A*, H
7) First or closest?→Neither: nothing to do.
  Domain 3: A*, H
  Domain 4: A*, H
  Domain 8: A*, H
  Domain 9: A*, H
Summary of expected egress interfaces:
Domain 1: <root>
Domain 2: H
Domain 3: A*, H
Domain 4: A*, H
Domain 6: A
Domain 7: H
Domain 8: A*, H
Domain g: A*, H
Note: All interfaces are only the physical interfaces on the current switch.
6) Setup routes as shown in Table 2:
Underlined routes are the new for non-SPF routing. Routes with an asterisk are inter-location routes.

TABLE 2

| Ingress Port | Destination Domain | Egress interfaces |
|---|---|---|
| x | 2 | H |
|   | 3 | A*, H |
|   | 4 | A*, H |
|   | 6 | A |
|   | 7 | H |
|   | 8 | A*, H |
|   | 9 | A*, H |
| A | 2 | H |
|   | 3 | <None> |
|   | 4 | <None> |
|   | 6 | <None> |
|   | 7 | H |
|   | 8 | <None> |
|   | 9 | <None> |
| H | 2 | <None> |
|   | 3 | A* |
|   | 4 | A* |
|   | 6 | A* |
|   | 7 | <None> |
|   | 8 | A* |
|   | 9 | A* |

Operation of the flowchart of FIGS. 6A and 6B for the network of FIG. 10 from the perspective of switch 1 results in the route table of Table 3:

Underlined routes are the new for non-SPF routing. Routes with an asterisk are inter-location routes. Strikethrough routes are SPF routes but are removed for non-SPF routing

TABLE 3

| Ingress Port | Destination Domain | Egress interfaces |
|---|---|---|
| x | 2 | B |
|   | 3 | A, B |
|   | 4 | A, B |
|   | 5 | E |
| A | 2 | B |
|   | 3 | <None> |
|   | 4 | <None> |
|   | 5 | E |
| B | 2 | <None> |
|   | 3 | A |
|   | 4 | A |
|   | 5 | E |
| E | 2 | B |
|   | 3 | A |
|   | 4 | A, ~~B~~ |
|   | 5 | <None> |

Through the use of a location ID associated with each switch or gateway, users can configure a fabric that can use non-shortest path routing. If the user makes changes to their switch, cabling, or adds or removes switches from a location, the locations are able to automatically adjust to those changes without needing additional details from the user. Similarly, using this switch level configuration parameter abstracts the feature away from any physical hardware or network configurations. Therefore there is a simple method to allow the switches to do non-shortest path routing to improve the use of parallel long distance links between separated fabrics ion a network.

While the above has been described using Fibre Channel switches or VCS switches in an Ethernet fabric from Brocade Communications Systems, Inc., the above methods and operations can be used in other types of fabrics or networks.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for routing comprising:
  determining whether each domain is local or is accessible over a distance link;
  developing a routing table which uses shortest path routing for all local domains and includes non-shortest path routes used for domains accessible over a distance link; and
  routing using the routing table,
  wherein said developing step includes:
    determining shortest path routes for all domains in the same location;
    determining routes to domains at different locations for each distance link;
    determining, for a switch connected to a distance link, for switches connected to the switch connected to a distance link, routes from the switches to the distance link; and
    removing, for a switch connected to a distance link, any routes from distance links to a location to distance links to the same location or local links to local links.

2. The method of claim 1, wherein said developing step further includes:
   determining, for devices connected to a switch, routes to domains at a different location that use all eligible links.

3. A switch comprising:
   at least one distance port for connection to a distance link to a remote location of a network, the remote location including at least one domain;
   at least one local port for connection to a device or switch at a local location of a network, the local location including at least one domain in addition to the switch;
   a processor;
   a memory coupled to said processor and containing software programs executed by said processor to perform functions; and
   a routing circuit connecting said at least one local port and said at least one distance port,
   wherein said software programs include instructions to cause said processor to:
      determine whether each domain is local or is accessible over a distance link;
      develop a routing table which uses shortest path routing for all local domains and includes non-shortest path routes used for domains accessible over a distance link; and
      provide said routing table to said routing circuit so that routing is performed using said routing table,
   wherein said developing step includes:
      determining shortest path routes for all domains in the same location;
      determining routes to domains at different locations for each distance link;
      determining, for a switch connected to said at least one local port, routes from the switch to said at least one distance port; and
      removing any routes from said at least one distance port to a location to another said at least one distance port to the same location or said at least one local port to another said at least one local port.

4. The switch of claim 3, wherein said developing a routing table further includes:
   determining, for devices connected said at least one local port, routes to domains at a different location using all eligible links.

* * * * *